US007585812B2

United States Patent
Hu et al.

(10) Patent No.: US 7,585,812 B2
(45) Date of Patent: Sep. 8, 2009

(54) HIGH SURFACE AREA, SMALL CRYSTALLITE SIZE CATALYST FOR FISCHER-TROPSCH SYNTHESIS

(75) Inventors: X. D. Hu, Louisville, KY (US); Patrick J. Loi, New Albany, IN (US); Robert J. O'Brien, Louisville, KY (US)

(73) Assignee: Sud-Chemie Inc., Louisville, KY (US)

( * ) Notice: Subject to any disclaimer, the term of this patent is extended or adjusted under 35 U.S.C. 154(b) by 0 days.

(21) Appl. No.: 12/214,809

(22) Filed: Jun. 20, 2008

(65) Prior Publication Data

US 2009/0036296 A1 Feb. 5, 2009

Related U.S. Application Data

(62) Division of application No. 09/851,177, filed on May 8, 2001, now Pat. No. 7,452,844.

(51) Int. Cl.
*B01J 23/00* (2006.01)
*B01J 21/00* (2006.01)
*B01J 20/00* (2006.01)
*B01J 29/06* (2006.01)

(52) U.S. Cl. .......... 502/327; 502/65; 502/66; 502/73; 502/74; 502/241; 502/245; 502/247; 502/248; 502/252; 502/253; 502/255; 502/257; 502/259; 502/260; 502/261; 502/262; 502/302; 502/303; 502/304; 502/306; 502/307; 502/309; 502/312; 502/313; 502/314; 502/315; 502/316; 502/318; 502/320; 502/322; 502/323; 502/328; 502/329; 502/331; 502/332; 502/333; 502/334; 502/335; 502/336; 502/337; 502/338; 502/339; 502/341; 502/342; 502/346; 502/354; 502/355; 502/415; 502/439

(58) Field of Classification Search .......... 502/65, 502/66, 73, 74, 241, 245, 247, 248, 252, 502/253, 255, 257, 259, 260, 261, 262, 302, 502/303, 304, 306, 307, 309, 312, 313, 314, 502/315, 316, 318, 320, 322, 323, 327, 328, 502/329, 331, 332, 333, 334, 335, 336, 337, 502/338, 339, 341, 342, 346, 354, 355, 415, 502/439

See application file for complete search history.

(56) References Cited

U.S. PATENT DOCUMENTS

| | | | | |
|---|---|---|---|---|
| 3,988,263 A | * | 10/1976 | Hansford | 502/337 |
| 4,093,450 A | * | 6/1978 | Doyle et al. | 75/365 |
| 4,102,851 A | * | 7/1978 | Luck et al. | 523/457 |
| 4,154,751 A | * | 5/1979 | McVicker et al. | 518/717 |
| 4,171,320 A | * | 10/1979 | Vannice et al. | 518/715 |
| 4,191,664 A | * | 3/1980 | McArthur | 502/335 |
| 4,199,522 A | * | 4/1980 | Murchison et al. | 518/714 |
| 4,206,135 A | * | 6/1980 | Kugler et al. | 518/715 |
| 4,273,724 A | * | 6/1981 | Kugler et al. | 518/715 |
| 4,396,539 A | * | 8/1983 | Sapienza et al. | 502/326 |
| 4,493,905 A | * | 1/1985 | Beuther et al. | 502/325 |
| 4,532,229 A | * | 7/1985 | Fiato et al. | 502/330 |
| 4,542,122 A | * | 9/1985 | Payne et al. | 502/325 |

(Continued)

*Primary Examiner*—Cam N. Nguyen

(57) ABSTRACT

A catalyst for use in the Fischer-Tropsch process, and a method to prepare the catalyst is disclosed. The catalyst of the present invention has a higher surface area, more uniform metal distribution, and smaller metal crystallite size than Fischer-Tropsch catalysts of the prior art.

20 Claims, 7 Drawing Sheets

U.S. PATENT DOCUMENTS

| | | | | |
|---|---|---|---|---|
| 4,559,364 A * | 12/1985 | Wood et al. | ................. | 518/715 |
| 4,562,174 A * | 12/1985 | Stiles | ...................... | 502/174 |
| 4,585,798 A * | 4/1986 | Beuther et al. | ............. | 518/715 |
| 4,598,062 A * | 7/1986 | Schneider et al. | .......... | 502/306 |
| 4,619,910 A * | 10/1986 | Dyer et al. | ................. | 502/336 |
| 4,647,592 A * | 3/1987 | Mauldin | ................... | 518/715 |
| 4,670,414 A * | 6/1987 | Kobylinski et al. | ......... | 502/174 |
| 4,717,702 A * | 1/1988 | Beuther et al. | ............. | 502/303 |
| 4,729,981 A * | 3/1988 | Kobylinski et al. | ......... | 502/259 |
| 4,738,948 A * | 4/1988 | Iglesia et al. | ............... | 502/326 |
| 4,740,490 A * | 4/1988 | Vanderspurt et al. | ....... | 502/177 |
| 4,801,573 A * | 1/1989 | Eri et al. | .................... | 502/302 |
| 4,822,824 A * | 4/1989 | Iglesia et al. | ............... | 518/709 |
| 4,857,497 A * | 8/1989 | De Jong et al. | ............ | 502/242 |
| 4,857,559 A * | 8/1989 | Eri et al. | .................... | 518/700 |
| 4,880,763 A * | 11/1989 | Eri et al. | .................... | 502/302 |
| 4,962,078 A * | 10/1990 | Behrmann et al. | .......... | 502/325 |
| 4,992,406 A * | 2/1991 | Mauldin et al. | ............ | 502/304 |
| 5,036,032 A * | 7/1991 | Iglesia et al. | ............... | 502/260 |
| 5,128,377 A * | 7/1992 | Behrmann et al. | .......... | 518/715 |
| 5,182,248 A * | 1/1993 | Cody et al. | ................. | 502/230 |
| 5,200,382 A * | 4/1993 | Cody et al. | ................. | 502/204 |
| 5,227,407 A * | 7/1993 | Kim | ......................... | 518/700 |
| 5,453,169 A * | 9/1995 | Callstrom et al. | ........... | 204/242 |
| 5,516,740 A * | 5/1996 | Cody et al. | ................. | 502/204 |
| 5,545,674 A * | 8/1996 | Behrmann et al. | .......... | 518/715 |
| 5,648,312 A * | 7/1997 | Rivas et al. | ................ | 502/325 |
| 5,733,839 A * | 3/1998 | Espinoza et al. | ............ | 502/336 |
| 5,780,381 A * | 7/1998 | Wilson et al. | ............... | 502/308 |
| 5,856,365 A * | 1/1999 | Zennaro et al. | ............. | 518/715 |
| 5,874,381 A * | 2/1999 | Bonne et al. | ................ | 502/327 |
| 5,962,367 A * | 10/1999 | Shen et al. | .................. | 502/439 |
| 5,990,040 A * | 11/1999 | Hu et al. | ..................... | 502/342 |
| 6,075,062 A * | 6/2000 | Zennaro et al. | ............. | 518/715 |
| 6,087,405 A * | 7/2000 | Plecha et al. | ............... | 518/715 |
| 6,100,304 A * | 8/2000 | Singleton et al. | ............ | 518/715 |
| 6,191,066 B1* | 2/2001 | Singleton et al. | ............ | 502/332 |
| 6,262,132 B1* | 7/2001 | Singleton et al. | ............ | 518/715 |
| 6,455,462 B2* | 9/2002 | van Berge et al. | ........... | 502/325 |

\* cited by examiner

HIGH SURFACE AREA, SMALL CRYSTALLITE SIZE CATALYST FOR FISCHER-TROPSCH SYNTHESIS

This application is a divisional of U.S. patent application Ser. No. 09/851,177, filed on May 8, 2001, now U.S. Pat. No. 7,452,844.

BACKGROUND

The present invention is for a catalyst for use in the Fischer-Tropsch process, and for a method to prepare the catalyst. The catalyst of the present invention has a higher surface area, more uniform metal distribution, and smaller metal crystallite size than Fischer-Tropsch catalysts of the prior art.

Since about 1923, the Fischer-Tropsch (F-T) process, which involves passing a continuous stream of synthesis gas ("syngas" or a mixture of hydrogen gas and carbon monoxide) over a supported metal catalyst, has been used for the conversion of syngas into higher value commercial products, such as gasoline, diesel fuels, linear alcohols, and $\alpha$-olefins. The catalysts used in the process are typically in the form of a pellet or powder having metal active sites on the surface of an essentially chemically inert material carrier. When the syngas reactants contact an active site on the catalyst, the carbon monoxide bonds are cleaved and hydrogenated producing a mixture of hydrocarbon products. For commercial operations, it is desirable that the gas be passed over the catalyst at an essentially constant and rapid rate. But because an active site can only be occupied by one molecule at a time, the most effective catalysts have a large number of active sites and high turnover (or conversion) rate.

Like all catalysts, the F-T catalyst itself is not permanently altered in the reaction. However, over time catalyst efficiency can be diminished by contamination of the active sites, for example, by deposition of carbon or other contaminants in the syngas feed or by coking or by the deposition of waxy hydrocarbon on the catalyst surface, thus requiring that the catalyst bed be cleaned or regenerated. Further, the catalyst efficiency can be irreversibly diminished if the catalyst particles sinter (fuse together) or crumble while the catalyst is packed in the catalyst bed because the syngas flow is then restricted and the number of available active sites are decreased. Because most commercial operations use continuous syngas streams, it can be costly and inconvenient to clean or otherwise regenerate or replace the catalyst bed. Thus, the most desirable Fischer-Tropsch catalysts can be used for an extended period between catalyst regeneration and do not require frequent replacement of the catalyst bed when exposed to normal industrial processing conditions.

As is known in the art, the composition and physical characteristics of the Fischer-Tropsch catalyst particles affect the catalyst activity. Typically, F-T catalysts include one or more metals selected from Group VIII of the Periodic Table of Elements (iron, cobalt, nickel, ruthenium, rhenium, palladium, osmium, iridium, platinum), a promoter, and a carrier or support. The Group VIII metal is added to effect the conversion of the syngas, and is selected based on the feed composition and the desired product mixture. (For a more extensive discussion of the F-T process see, for example, "Practical And Theoretical Aspects Of The Catalytic Fischer-Tropsch Process," *Applied Catalysis A: General* 138 (1996) 319-344 by M. E. Dry, incorporated herein by reference.) Cobalt is commonly used in F-T catalysts because of its commercial availability, its efficiency in converting the syngas to longer chain hydrocarbons, its ease of handling, its low activity in water-gas shift reactions, and its relative low cost as compared to other Group VIII metals. The promoters are added to improve certain properties of the catalyst or to improve the catalyst selectivity, and ruthenium, copper, and alkali metals are commonly used promoters for cobalt-based catalysts. The carriers, such as silica, alumina, or alumino-silicates, provide a means for increasing the surface area of the catalyst. For a more extensive review of Fischer-Tropsch catalyst compositions, see for example, U.S. Pat. No. 5,248,701, issued to Soled et al, and the references therein (incorporated herein by reference).

The physical characteristics of the Fischer-Tropsch catalyst are also important. Because the hydrogen gas and carbon monoxide must make physical contact with the Group VIII metal for the conversion to occur, catalyst particles with uniform metal distribution, homogeneous metal loading and high surface areas have higher activity rates in a commercial scale slurry bed reactor than particles with the metal localized on the surface.

Thus, it would be beneficial to have a cobalt-based Fischer-Tropsch catalyst that has a high surface area, a smooth, homogeneous surface morphology, and a uniform distribution of metal throughout the catalyst. Because studies have shown that the metal crystallite size might affect the hydrogenation reactions, the catalyst would preferably have a smaller crystallite size than current Fischer-Tropsch catalysts. Further, the catalyst should be easy to prepare on a commercial scale.

SUMMARY OF THE PRESENT INVENTION

The Fischer-Tropsch catalyst of the present invention is a transition metal-based catalyst having a high surface area, a smooth, homogeneous surface morphology, an essentially uniform distribution of cobalt throughout the support, and a small metal crystallite size. In a first embodiment, the catalyst has a surface area of from about 100 $m^2/g$ to about 250 $m^2/g$; an essentially smooth, homogeneous surface morphology; an essentially uniform distribution of metal throughout an essentially inert support, and a metal crystallite size of from about 40 Å to about 200 Å. In a second embodiment, the Fischer-Tropsch catalyst is a cobalt-based catalyst with a first precious metal promoter and a second metal promoter on an aluminum oxide support, the catalyst having from about 5 wt % to about 60 wt % cobalt; from about 0.0001 wt % to about 1 wt % of the first promoter; and from about 0.01 wt % to about 5 wt % of the second promoter.

The high surface area transition metal-based catalysts of the present invention are prepared in a non-acidic solution at a pH greater than about 7.0, and starting with a non-acidic transition metal complex. The resulting product is a catalyst with a uniform distribution of metal throughout the catalyst particles, with a smooth and homogeneous surface morphology, and with slow crystallite growth upon heating.

DETAILED DESCRIPTION OF THE PREFERRED EMBODIMENTS

Figure 1:
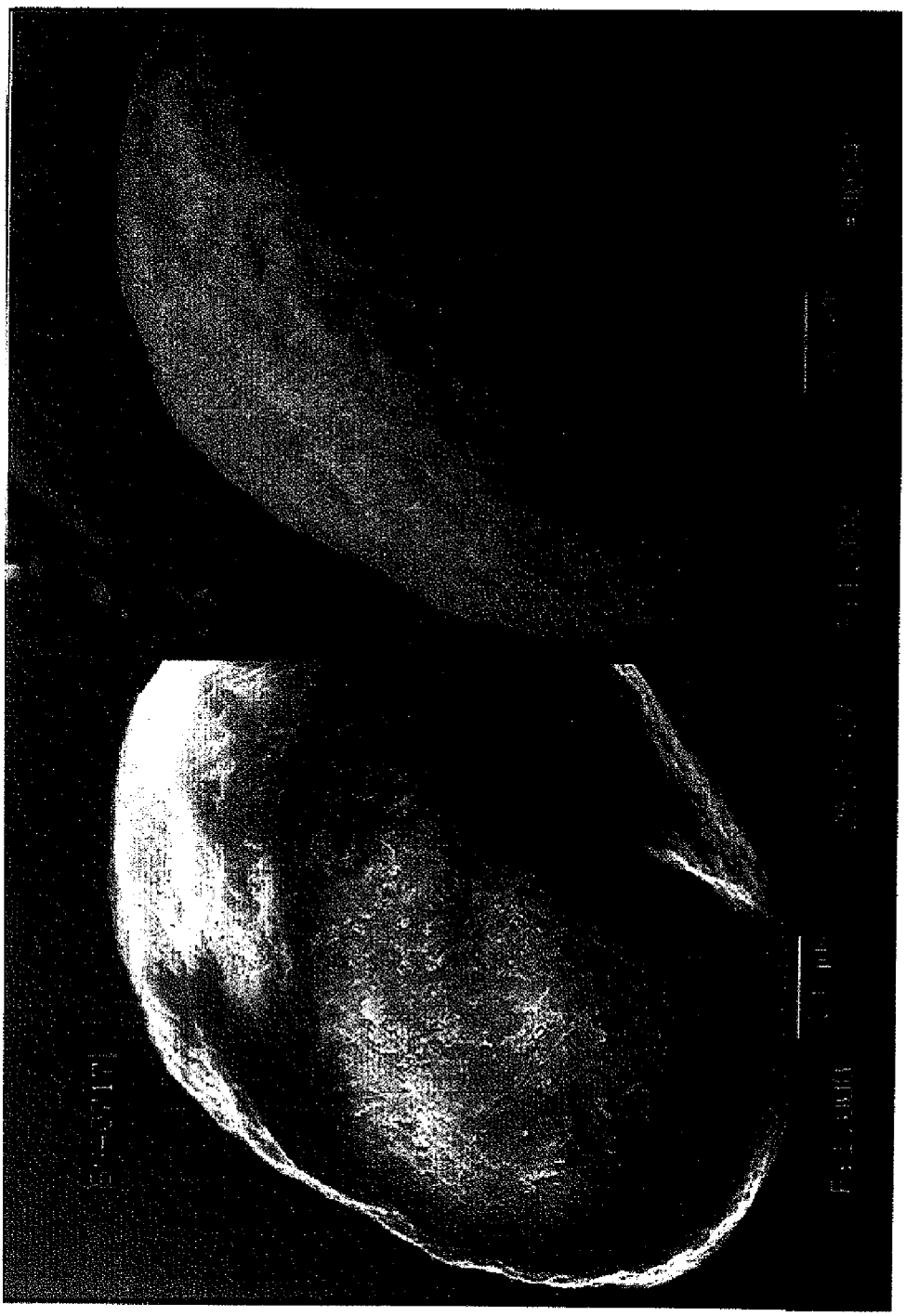
FIG. 1A is a secondary electron image of a scanning electron micrograph, magnification 1600× (measured when the image is produced in a sheet of 8.5"×11" paper), of an embodiment of a catalyst of the present invention, the catalyst being a platinum promoted cobalt coated aluminum oxide catalyst prepared as described in Example 2.
FIG. 1B is a back-scattered electron image of scanning electron micrograph, magnification 1600× (measured when the image is produced in a sheet of 8.5"×11" paper), of the same catalyst particle of FIG. 1A.

The catalyst of the present invention is intended for use in the Fischer-Tropsch (F-T) process. The catalyst composition is similar to F-T catalysts of the prior art and includes cobalt and a carrier or support. However, because of the process by which the catalyst is prepared, the physical characteristics of the catalyst of the present invention include a higher surface area, a smoother, more homogeneous surface morphology, a more uniform distribution of active sites, and a smaller crystallite size than the prior art F-T catalysts. (For a more extensive discussion of the cobalt-based F-T catalysts, see "Design, synthesis, and use of cobalt-based Fischer-Tropsch synthesis catalyst," *Applied Catalysis A: General* 161 (1997) 59-78, by E. Iglesia, incorporated herein by reference.)

The Fischer-Tropsch process is a surface-catalyzed polymerization process that converts synthesis gas (mixture of hydrogen gas and carbon monoxide) to hydrocarbons with a broad range of chain lengths and functionality. It is widely accepted that the initial step in the process is the adsorption of carbon monoxide on the catalyst surface. Hydrogenation of the adsorbed carbon monoxide produces $CH_x$ monomers which remain on the catalyst surface. Hydrocarbon chain growth occurs by addition of surface methylene species to adsorbed alkyl groups. The chain is terminated, and released from the catalyst surface, by hydrogenation of the adsorbed alkyl group to form n-paraffins or by β-hydrogen abstraction from the alkyl group to form linear α-olefins. (For a more extensive discussion of the F-T process see "Practical And Theoretical Aspects Of The Catalytic Fischer-Trosch Process," *Applied Catalysis A: General* 138 (1996) 319-344 by M. E. Dry, and "Fischer-Tropsch Synthesis: Current Mechanism and Future Needs", Preprints, ACS Fuel Division, 45(1), (2000) 129-133 CA 132: 239079, incorporated herein by reference.)

Typically, the catalysts used in the Fischer-Tropsch process include at least one metal that is an efficient carbon monoxide adsorber and that is effective for hydrogenation reactions. The metals most commonly used in F-T catalysts are nickel, cobalt, and iron. Studies have also been conducted with ruthenium, osmium, platinum, palladium, iridium, rhenium, molybdenum, chromium, tungsten, vanadium, rhodium, copper and zinc (see, for example, U.S. Pat. No. 4,801,573, issued to Eri et al., and references therein, which are incorporated herein by reference). Cobalt-based catalysts are preferred for the production of a spectrum of hydrocarbons while minimizing the production of carbon dioxide. Nickel-based catalysts tend to produce large quantities of methane; iron-based catalysts produce a spectrum of hydrocarbons, but also generate substantial quantities of carbon dioxide; and ruthenium-based catalysts generate predominantly methane or high melting waxes, depending on the reaction conditions. The catalyst of the present invention is cobalt-based, with the catalyst comprising from about 5 wt % to about 60 wt % cobalt, based on the total catalyst weight, including the cobalt. In a more preferred embodiment, the catalyst comprises from about 10 wt % to about 40 wt % cobalt; and in a most preferred embodiment, the amount of cobalt is from about 10 wt % to about 30 wt %.

Fischer-Tropsch catalysts also commonly include at least one promoter which is added to improve selected properties of the catalyst or to modify the catalyst activity and/or selectivity. In the present invention, two promoters are included in the most preferred embodiment—a first precious metal promoter and a second metal promoter—because the combination of promoters was deemed to be the most effective for producing the desired hydrocarbon mixture starting with a natural gas feed. However, the addition of a promoter is not required to prepare the catalyst having a high surface area, a smooth, homogeneous surface morphology, a uniform distribution of active sites, and a small crystallite size. For cobalt-based catalysts the prior art has reported numerous promoters, such as boron, cerium, chromium, copper, iridium, iron, lanthanum, manganese, molybdenum, palladium, platinum, rhenium, rhodium, ruthenium, strontium, tungsten, vanadium, zinc, sodium oxide, potassium oxide, rubidium oxide, cesium oxide, magnesium oxide, titanium oxide, zirconium oxide, and other rare earth metals, such as scandium, yttrium, praseodymium, neodymium, promethium, samarium, europium, gadolinium, terbium, dysprosium, holmium, erbium, thulium, ytterbium, lutetium. In the most preferred embodiment of the present invention, the precious metal promoter is preferably selected from the group consisting of palladium, platinum, ruthenium, rhenium, rhodium, iridium and a combination thereof, and the second promoter is selected from the group consisting of potassium, boron, cesium, lanthanum, cerium, strontium, scandium, yttrium, praseodymium, neodymium, promethium, samarium, europium, gadolinium, terbium, dysprosium, holmium, erbium, thulium, ytterbium, lutetium, palladium, platinum, ruthenium, rhenium, rhodium, iridium and a combination thereof. Other metals may be substituted for either the first or the second promoter if so desired by the user to modify the catalyst properties or to modify the catalyst's activity and/or selectivity. The promoters are generally added in smaller concentrations than the cobalt, and in the present invention, the precious metal promoter preferably comprises from about 0.0001 wt % to about 1 wt %, and more preferably comprises from about 0.001 wt % to about 0.05 wt % of the total catalyst weight, and the second promoter preferably comprises from about 0.01 wt % to about 5 wt %, more preferably comprises from about 0.1 wt % to about 1 wt % of the total catalyst weight.

The metal and promoter of the Fischer-Tropsch catalyst are usually dispersed on or compounded with a carrier or support. The support provides a means for increasing the surface area of the catalyst. Recommended carriers include aluminum oxide, γ-alumina, alumina monohydrate, alumina trihydrate, alumina-silica, magnesium silicate, silica, silicate, silicalite, y-zeolite, mordenite, titania, thoria, zirconia, niobia, hydrotalcite, kieselguhr, attapulgite clay, zinc oxide, other clays, other zeolites and combinations thereof. The catalyst of the present invention is prepared with a high purity aluminum oxide support having a particle size of from about 60 μm to about 150 μm, a surface area of from about 90 $m^2/g$ to about 210 $m^2/g$, a pore volume of from about 0.35 ml/g to about 0.50 ml/g, and an average pore diameter of from about 8 nm to about 20 nm.

The physical structure of the Fischer-Tropsch catalyst also affects the catalyst activity and, as is known in the art, selecting the proper catalyst design for a particular type of reactor can translate to relatively high production rates and relatively low maintenance costs for a commercial producer. Catalyst design includes choosing the right type and form of catalyst for a given situation, then specifying its size, porosity, catalytic-species distribution and other properties. The catalyst's structural or mechanical properties, including particle strength and attrition resistance, depend on the chemical stability and microstructure of the support and on the presence of binders. The catalyst particle's shape and size affect properties such as flow distribution and pressure drop.

Fischer-Tropsch catalysts are commonly used in either a gas phase fixed bed or a liquid phase slurry bed reactor. In a fixed-bed reactor, the catalyst is packed within tubes or is spread across a tray and remains essentially stationary as the reactants are passed over the catalyst bed. Because the catalyst particles are usually tightly packed (and stacked) in multiple layers and because replacing the catalyst bed can be time consuming and costly, the catalyst is preferably designed to maximize catalyst strength and porosity, and to maximize catalyst life. Further, because the reactants pass over the catalyst bed in a continuous stream, it is beneficial that the catalyst particles be relatively large (in the range of from about 1 mm to about 10 mm), that the catalyst be designed to minimize pressure drop and pore diffusional resistance, and that the active sites be easily accessible. For example, U.S. Pat. No. 5,545,674, issued to Behrmann et al., and incorporated herein by reference, describes a supported cobalt catalyst having a catalytically active film wherein essentially all of the active cobalt is deposited on the surface of the support particles while cobalt is excluded from the inner surface of the particles, thus providing easily accessible active sites for the syngas reactants and minimizing diffusion of the reactants.

In the present invention, the catalyst is designed for use in a liquid phase slurry bed reactor. In a slurry bed reactor, the catalyst is suspended in a reaction solvent and continually agitated as reactants are fed into the reactor. Catalysts for use in the slurry bed are preferably designed to maximize activity, selectivity, and resistance to attrition, and the metal distribution and surface morphology strongly influences the performance of the catalyst. Because the catalyst particles in the slurry bed reactor are typically finely divided powdered particles, the catalyst activity can be increased by depositing metal over a large area of the support surface, including within the inner surface of the support particles thereby increasing the accessibility to active sites for the reactants. Furthermore, because the turnover rate per site (rate at which a molecule of starting material is converted to product and released from the active site) is constant for a particular metal, increasing the number of active sites on a catalyst's surface results in increased starting material conversion, and hence, a higher product yield per unit time. The catalyst particles for a slurry bed reactor are generally small (in the range of from about 20 μ to about 200 μ in diameter), and ideally have a high surface area, a smooth, homogeneous surface morphology, and a uniform distribution of metal throughout the particles. (For a discussion of designing catalysts and catalytic reactors see Bartholomew et al, "Catalytic Reactor Design" Chemical Engineering, 1994, pp. 70-75, incorporated herein by reference.)

The degree of metal dispersion in the Fischer-Tropsch catalyst is affected by several factors including the surface area of the support, the initial metal or metal oxide crystallite size, the metal support interaction and the ability to provide homogenous mixing of the metal with the support. As the surface area of the support increases, a higher concentration of metal can be dispersed over the surface as a monolayer. For example, if cobalt is dispersed over a support with a BET surface area of 50 $m^2/g$, approximately 67% of the surface is covered by a fully-dispersed monolayer of cobalt at a 5% cobalt loading. However, if the support BET surface area is 200 $m^2/g$, at a 5% cobalt loading only about 17% of the surface is covered by a cobalt monolayer, and the approximately 67% surface coverage is not approached until the cobalt loading is at about 20%. In the preferred embodiment of the present invention, the BET surface area of the support is from about 90 $m^2/g$ to about 210 $m^2g$. ("BET surface area" refers to the surface area of a particle as determined by using the Brunauer, Emmett, Teller equation for mulimolcular adsorption. For more information about the BET equation and its applications, see *Introduction to Colloid and Surface Chemistry*, $2^{nd}$ Edition, D. J. Shaw, published by Butterworth (Publishers) Inc, 1978.)

The metal crystallite size is inversely proportional to the metal dispersion, i.e., as the crystallite size decreases, the dispersion increases. However, there is a practical lower limit to the crystallite size because at very small crystallite sizes, sintering occurs during use destroying the utility of the catalyst. For the cobalt-based F-T catalyst, studies have shown that when the cobalt crystallite size is less than about 50 Å diameter, the crystallites appear to deactivate rapidly in the presence of water, which is typically present in the Fischer-Tropsch process (see Iglesia, p 64). In a preferred embodiment of the invention, the cobalt oxide crystallite size, as determined based on line broadening of X-ray diffraction patterns using methodology known in the art, is greater than about 40 Å diameter, and is preferably less than about 200 Å. More preferably, the crystallite size is from about 50 Å to about 150 Å, and most preferably, the crystallite size is from about 50 Å to about 120 Å.

The metal/support interaction also affects the metal dispersion because if there is a strong affinity between the metal and the support, the metal is less likely to migrate across the support surface, and thus, the metal remains dispersed. The metal/support interaction is dependent on the metal precursor used to deposit the metal on the support surface and on the catalyst preparation method, particularly the temperatures applied to reduce the metal precursor. For cobalt-based F-T catalysts, studies have shown that optimum cobalt dispersion is achieved when the cobalt precursor can be reduced by slow, relatively low temperature reductions, and it is desirable to maintain a reduction temperature of less than about 530° C. to minimize the degree of sintering (see Iglesia, p 64). In a preferred embodiment of the present invention, the cobalt precursor is selected such that the precursor reduction is accomplished via a slow temperature increase with the reduction temperatures ranging between from about 250° C. to about 500° C. and the temperature increasing at a rate of from about 0.1° C./min to about 10° C./min., and with the reduction time ranging from about 5 hours to about 40 hours, and more preferably from about 10 hours to about 30 hours.

The metal dispersion and other physical characteristics of the Fischer-Tropsch catalyst are as important to the performance of the catalyst as is the catalyst composition and are directly affected by the process used to prepare the catalyst. The prior art cobalt-based Fischer-Tropsch catalysts may be prepared using an impregnation method, an acid-base precipitation method, or a compounding method. The impregnation method involves either spraying or submerging the carrier or support with an aqueous cobalt salt solution. In order to coat the support with the desired amount of cobalt, the support typically needs to be submerged numerous times, making preparation time consuming and costly. It is also difficult to control where the cobalt is deposited on the surface, so clumping of the metal is likely. Most commonly a cobalt nitrate solution is used in the impregnation process, but the nitrate-solution coated support must be dried and calcined after each impregnation—by spraying or submersion—increasing the catalyst preparation time, energy consumption and preparation cost. Using the cobalt nitrate solution also produces by-products, nitrogen oxides (NOx), which are harmful to the environment. Alternatively, a cobalt acetate solution may be used in the impregnation process. While this variation avoids the formation of nitrogen oxides, the process is time-consuming and relatively expensive because multiple impregnation steps are required. The acid-base precipitation method typically involves providing a basic solution of precipitating agent and mixing it with an acidic solution of a cobalt metal precursor, generally in the form of a cobalt salt, and a supporting material, thereby causing the cobalt metal precursor to precipitate with the support material. Commonly used precipitating agents include ammonium carbonate or ammonium hydroxide and cobalt nitrate is frequently used as the cobalt metal precursor. The catalyst formed by this acid-base precipitation process performs well and is very durable, but the ammonia-based by-products, such as ammonium nitrate, formed during the production stage present safety hazards for workers. Alternatively, sodium carbonate or sodium bicarbonate may be used as precipitating agents in place of the ammonia-base compounds. However, this substitution increases the risk of contaminating the catalyst with excess sodium which can have deleterious effects on the catalyst's activity and selectivity. Thus, a multi-stage washing process must be added to remove the sodium, increasing preparation time and cost. Compounding involves mixing a water insoluble cobalt salt with the support material for an extended period of time and then thermally drying the product. The main drawback for the compounding method is the difficulty in achieving a homogeneous metal with support material mix. Rather, the cobalt metal tends to self-agglomerate. Further, the temperatures required to dry the supported catalysts can cause sintering or decomposition of the support.

In the present invention, although the catalyst composition is similar to that of Fischer-Tropsch catalysts of the prior art, the process by which the catalyst is prepared results in a catalyst with unique physical characteristics, including a higher surface area, a smoother, more homogeneous surface morphology, a more uniform distribution of active sites, and a smaller crystallite size than the prior art F-T catalysts. Broadly presented, the process for preparing a preferred embodiment of the catalyst of the present invention includes directly treating the catalyst support with an aqueous cobalt salt solution (the cobalt precursor) having a pH value greater than the point of zero charge of the support, then drying/calcining the coated support by known drying methods, followed by reducing the metal precursors slowly at relatively low temperatures, and then stabilizing the catalyst by known methods.

More specifically, to prepare the high surface area cobalt-based catalysts of the present invention a catalyst support slurry is prepared by adding the support to water with agitation and while maintaining the reaction temperature at from about 35° C. to about 210° C., and more preferably from about 65° C. to about 120° C., at a pressure of from about 500 mm Hg to about 2000 mm Hg, and more preferably from about 700 mm Hg to about 900 mm Hg. Once the support slurry temperature remains stable, and while maintaining agitation, the aqueous cobalt salt solution is added to the reaction tank either by pumping the salt solution into the tank or by adding the salt solution as bulk dosages over time. The dose can vary depending on the batch size, frequency of addition, and reaction solvent evaporation rate. It is desirable that the slurry temperature and the volume of the batch remain essentially constant as the coated support is prepared. The volume can be adjusted either by adding salt solution or by adding water, and the addition rate may be altered as necessary to maintain the reaction temperature. After the cobalt salt solution is added to the support slurry, the slurry is maintained at from about 65° C. to about 120° C., and the volume is held essentially constant by the addition of water, until the coating reaction is essentially complete. The liquor is then decanted from the coated support and the support is washed with water to remove any loose material. The washed support is then dried and calcined, using spray dryers, ovens, vacuum dryers, fluid bed dryers, belt dryers and similar drying means as are known in the art. Preferably the drying temperatures are maintained at from about 90° C. to about 375° C., and more preferably from about 120° C. to about 260° C., and the air flow rate is greater than about 1000 liter/hr/liter catalyst.

In a preferred embodiment, the support is a high purity aluminum oxide having a particle size of from about 60 μm to about 150 μm in diameter, a surface area of from about 90 $m^2/g$ to about 210 $m^2/g$, a pore volume of from about 0.35 ml/g to about 0.50 ml/g, and an average pore diameter of from about 8 nm to about 20 nm. One such support is Puralox® SCCa 5/150, manufactured by CONDEA Vista Company, Houston, Tex. 77224-9029. Other supports may be substituted for the aluminum oxide, but the substitute should have essentially similar particle size, surface area, pore volume, and pore diameter characteristics.

The aqueous cobalt salt solution is a combination of a specific cobalt salt, the cobalt precursor, and water. In a preferred embodiment the cobalt salt is a hexaammine cobalt (II) carbonate complex. The cobalt hexaammine solution is added to the aluminum oxide support slurry by pumping at a rate that results in a decomposition time of from about 2 hours to about 12 hours, and preferably from about 4 hours to about 8 hours, while maintaining the slurry temperature at from about 65° C. to about 120° C., until the reaction is complete. For the cobalt hexaammine precursor the decomposition or completion of the reaction is indicated by a reaction solution color change from a red to a pale orange or essentially colorless color, the color depending on the amount of residual cobalt ammine ion present, the decomposition temperature and time. The cobalt hexaammine coated aluminum oxide support is then oven dried at a temperature of about 93° with an air flow of about 17 SCFH for about 20 hours.

Other cobalt salts may be used for the catalyst provided that the salt is a cobalt (II) complex which has a pH value greater than the point of zero charge of the support in an aqueous medium. The point of zero charge (PZC) refers to the pH at which the surface of a metal oxide particle suspended in an aqueous medium is effectively neutral. When metal oxide particles are in an aqueous medium a net surface charge is produced on each particle by the particle adsorbing protons (producing a positively charged surface) or hydroxide ions (producing a negatively charged surface) from the surrounding water. The PZC is the intermediate pH at which the adsorption of proton ions essentially balances that of hydroxide ions. Various techniques, which are known in the art, can be used to determine the PZC for any particular support. For example, in a preferred embodiment, the cobalt salt may be any cobalt (II) complex having coordination sphere ligands such as water, chloride ion, ammonia, pyridine, triphenylphosphine, 1,2-diaminoethane, diethylenetriamine, triethylenetetraamine, acetate, oxalate, 2,4-pentanedione, ethylenedinitilo tetraacetic acid, and combinations thereof, and preferably, the coordination sphere ligands are water molecules or ligands that coordinate to the metal via nitrogen and combinations thereof. Because the cobalt—coordination sphere ligand complex may be cationic, the outer sphere of the complex may include one or more anions to balance the charge. Any anionic species that will not contaminate the support or adversely interfere with the reduction of the cobalt may be used, such as hydroxide, nitrate, carbonate, bicarbonate, chloride, sulfate, bisulfate and combinations thereof. The cobalt salt is dissolved in water before being added to the support slurry and the concentration of the cobalt salt solution can vary as desired. Various monitoring techniques, which are known in the art, can be used to determine when the starting salt complex has been depleted from solution, such as noting reaction solution color changes, titrating, chromatography, or other monitoring procedures as are known by those skilled in the art.

If one or more promoters are included in the composition, the promoters may be added either to the cobalt salt solution before addition of the salt solution to the support slurry or the promoters can be impregnated on the cobalt coated support. When the promoters are added to the salt solution, the salt/promoter solution is added to the support slurry in the same manner as described for the cobalt salt solution without promoters. In a preferred embodiment, rhenium (VII) oxide and ruthenium nitrosyl nitrate are added to the cobalt hexaammine carbonate solution and are then fed into the support slurry with the cobalt complex. The coated aluminum oxide support is then washed with water and dried at about 93° C. with an air flow of about 17 SCFH.

When the impregnation method is used to add the promoters, the dried cobalt coated support material is dipped in an aqueous solution of promoters and agitated for a predetermined time period, and is then dried. The primary advantage of adding the promoters to the salt solution is that the additional impregnation step can be eliminated, thereby reducing catalyst preparation costs. From a performance perspective, no significant differences are observed between the promoter addition methods. Preferably, the promoters are added as metal salts, such as rhenium (VII) oxide, ruthenium nitrosyl nitrate, platinum chloride, platinum ammine nitrate, platinum ammine chloride, and combinations thereof In a preferred embodiment, an aqueous solution of rhenium (VII) oxide and ruthenium nitrosyl nitrate is prepared, and then the coated cobalt aluminum oxide support is added to the rhenium/ruthenium solution. The promoter/support solution is agitated for about one hour, and then the liquor is decanted and the material is maintained at about 93° C. with an oven gas flow of about 2.5 SCFH until dry.

Figure 5:
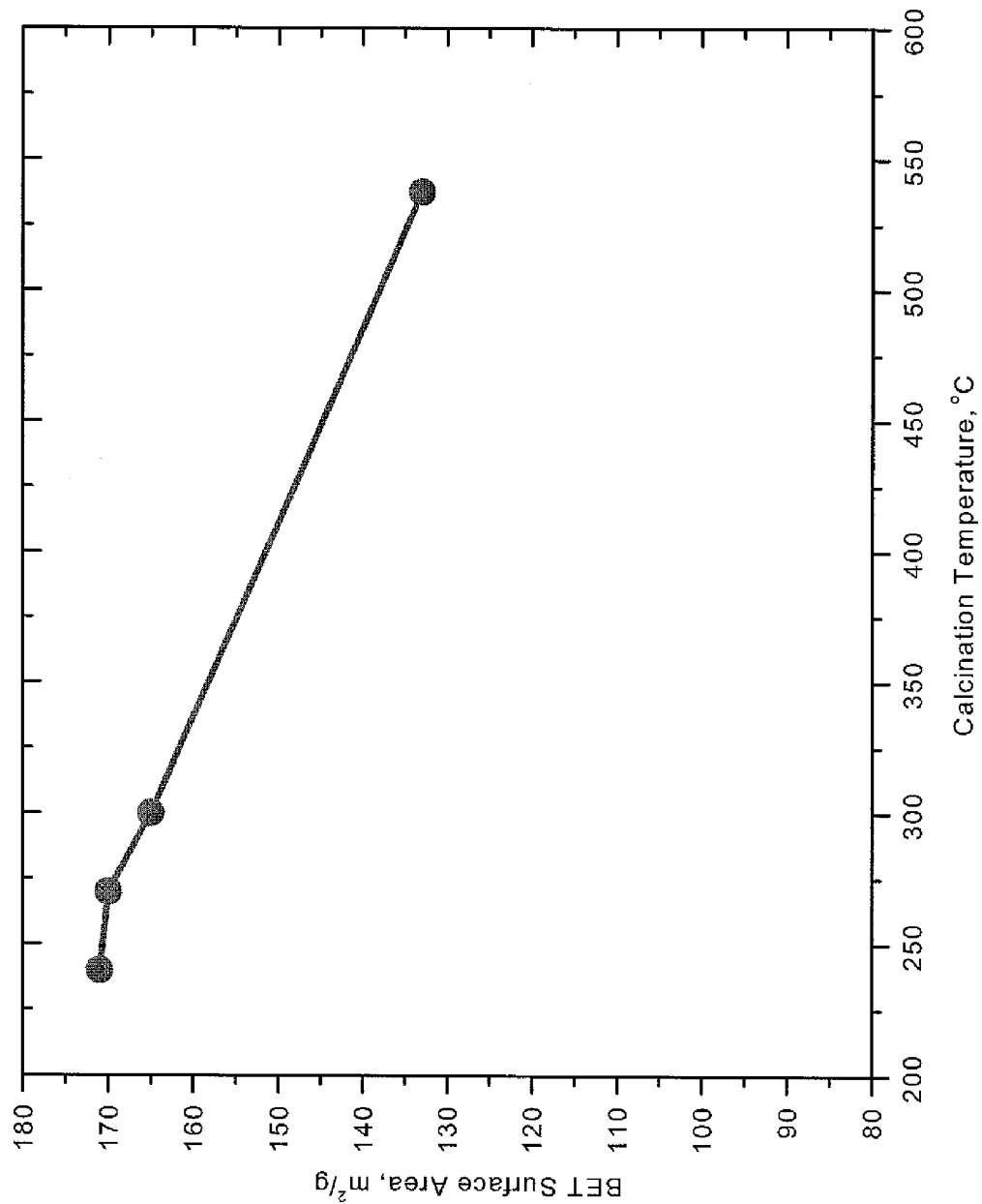
FIG. 5 is a graph showing the effect of the calcination temperature on the BET surface area of a cobalt catalyst of the present invention prepared without a promoter.
Figure 6:
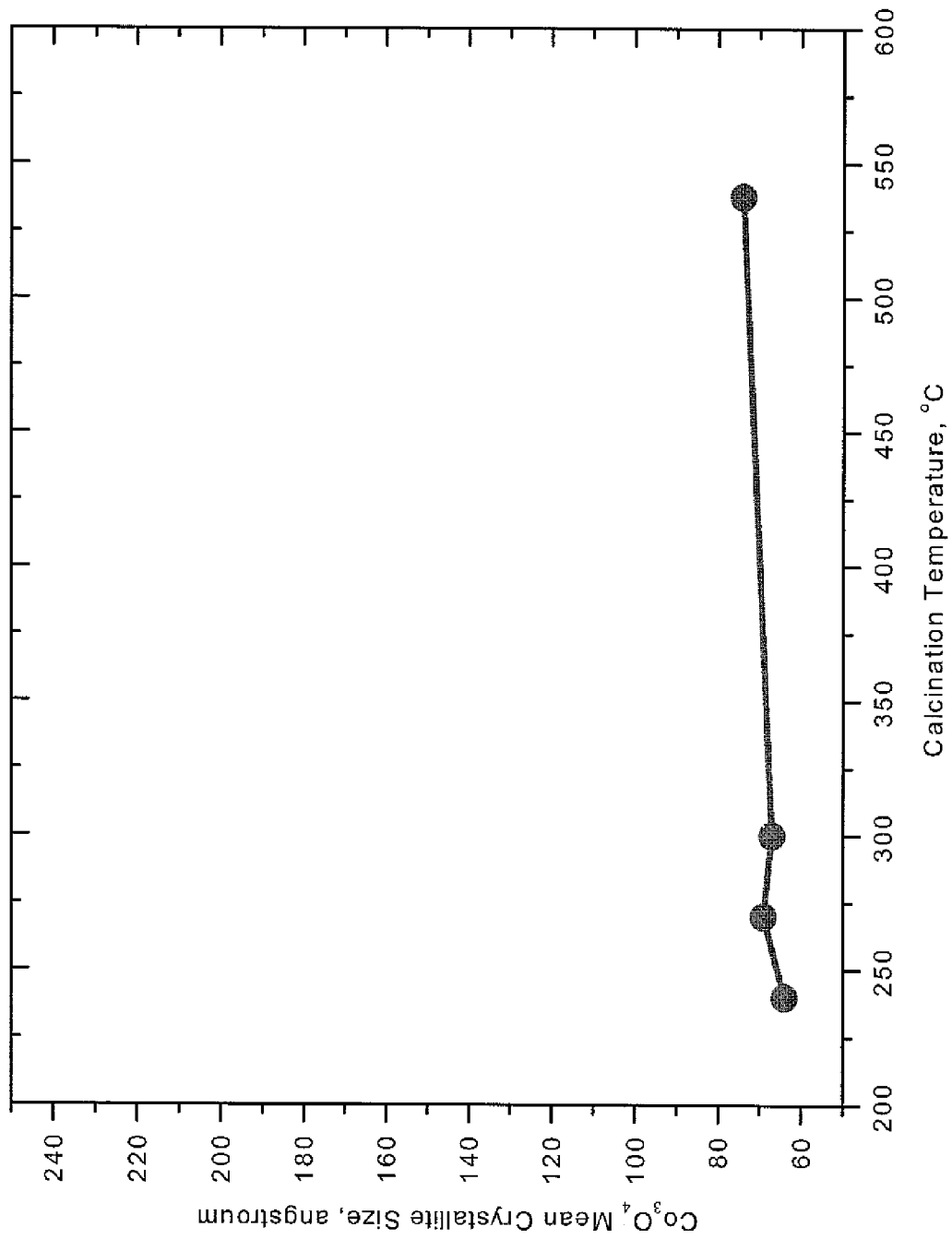
FIG. 6 is a graph showing the effect of the calcination temperature on the mean crystallite size of a cobalt catalyst of the present invention prepared without a promoter.

The dried coated support is reduced by slowly heating the support from ambient temperature to from about 300° C. to about 500° C. at a rate of from about 0.1° C./min to about 10° C./min, over a period of from about 5 hours to about 40 hours, and more preferably from about 10 hours to about 30 hours. FIGS. 5 and 6 show the effect of the calcination temperature on a cobalt catalyst of the present invention prepared without a promoter. As shown in FIG. 5, as the calcination temperature increases, the BET surface area decreases. Concurrently, as shown in FIG. 6, as the calcination temperature increases, the mean crystallite size also increases. Because metal dispersion increases in the catalyst particles as the surface area increases and as the crystallite size decreases, relatively low calcination temperatures are preferred in the process for preparing the cobalt-based catalyst. In a preferred embodiment, a dried aluminum oxide support treated with a cobalt hexaammine carbonate precursor and including rhenium (VII) oxide and ruthenium nitrosyl nitrate promoters is reduced using a fixed bed tubular reactor at about 350° C., under 350 psig of pressure, and having an hourly space velocity of greater than about 10,000 liters per hour. The reduction starts at ambient temperature and slowly raises the temperature at about 1° C./min to about 350° C. and then maintains the temperature at about 350° C. for from about 12 hours to about 16 hours.

Thus, the cobalt catalyst of the present invention is made by directly treating the catalyst support with the cobalt precursor having a pH value greater than the point of zero charge of the support, then drying/calcining the coated support by known drying methods, and reducing the metal precursors slowly at relatively low temperatures. The resulting catalyst has an essentially uniform distribution of cobalt throughout the catalyst particle, has a small cobalt crystallite size, and has a smoother, more homogeneous surface morphology than FT catalysts of similar composition prepared by prior art methods. The small cobalt crystallites tend to be pyrophoric, so the catalyst particles are preferably stabilized using known methods, such as by coating the catalyst particles with oil prior to exposure to air.

The following examples illustrate and explain the present invention, but are not to be taken as limiting the present invention in any regard. Examples 1-4 describe the preparation of embodiments of the present invention prepared without a promoter (Example 1), with a platinum promoter (Example 2), with a ruthenium promoter (Example 3), and with ruthenium/rhenium promoter (Example 4). Examples 5-10 describe the preparation of catalysts with similar compositions as the catalysts of Examples 1-4 except that the catalysts of Examples 5-10 are prepared using prior art impregnation methods. If deionized water is required for a reaction, the water can be deionized using commercially available ion exchange cartridges. Other materials are commercially available from Aldrich Chemical Company, 1001 West Saint Paul Avenue, Milwaukee, Wis., 53233; CONDEA Vista Company, Houston, Tex. 77224-9029; and Noah Technologies, San Antonio, Tex. 78249. Reactions are conducted in stainless steel mix tanks which may be fitted with steam heaters and/or propeller agitators. Where drying steps are indicated, the catalyst is dried in convection oven manufactured by Forma Scientific.

EXAMPLE 1

In a preferred embodiment, a cobalt catalyst without a promoter is prepared using a hexaamminecobalt (II) carbonate complex. To a mix tank having a total capacity of about 15 gallons and fitted with a closed coil steam heater and a propeller agitator, about 6 gallons of deionized water is added. The water is agitated at from about 500 rpm to about 1000 rpm by an air powered agitator, and is steam heated until the water reaches a temperature of from about 82° C. to about 85° C. The steam flow rate is measured with a Brooks 3604&09 Hi Pressure Thru-Flow Indicator, and at a temperature of about 168° C. and pressure of about 100 psig, the steam flow is varied from about 10 pounds per hour (PPH) to about 13 PPH. To the mix tank is added 3677.5 g of aluminum oxide support (CONDEA, Puralox SCCa 5/150). The steam heating is adjusted to maintain the aluminum oxide solution, or slurry, temperature at from about 82° C. to about 85° C. In a separate mixing vessel, a cobalt ammine carbonate solution is prepared by reacting cobalt powder with aqueous ammonia in the presence of carbon dioxide to deliver about 3.58 g Co per 100 mL water. When the mix tank temperature is stabilized, the cobalt ammine carbonate solution is pumped to the mix tank at a rate of about 50 mL per minute using a peristaltic pump (Model 7523-20, available from Cole-Parmer Instruments Company, Vernon Hills, Ill. 60061-1844). The rate of cobalt ammine carbonate solution addition may be adjusted to compensate for steam and ammonia loss from the slurry, with the objective being to maintain essentially a constant slurry volume of about 19 liters in the mix tank. A total of about 30.99 liters of cobalt ammine carbonate solution is added to the mix tank over a period of from about 10 hours to about 11 hours. After the cobalt ammine carbonate solution is completely added, additional deionized water is added to the mix tank to maintain the total slurry volume at about 19 liters. The slurry temperature is maintained at from about 82° C. to about 85° C. until decomposition is complete, or for about 5 to 6 hours. For the hexaammine cobalt (II) precursor, the decomposition is indicated by a slurry color change from a red or pink color to a pale orange color. The slurry is then allowed to cool in the mix tank to about ambient temperature by terminating the steam flow. The solid material in the slurry is allowed to settle, and the liquor is decanted from the solids. The solid material is then washed over a filter with about 4 gallons of deionized water. The washed material is then spread on a stainless steel tray to a depth of about 1 inch. The material is dried in a Forma Scientific convection oven fitted with an air inlet set at 480 slph, using an oven temperature setting of about 93° C. The total drying time is about 20 hours. The cobalt coated aluminum oxide catalyst is then calcined in an electric box oven (Model 7075, available from The Electric Hotpack Company, Inc, Philadelphia, Pa.) set at about 240° C. for about 2 hours.

EXAMPLE 2

A cobalt catalyst with a platinum promoter is prepared using a hexaamminecobalt (II) carbonate complex. About one liter of deionized water is added to a stainless steel beaker, having a total capacity of about 4 liters and fitted with a propeller agitator. The water is agitated at a maximum setting using a RZR 1 stirrer (Cafrano Ltd., Wharton, ON, Canada, NOH 2TO), and is heated on a hot plate until the water reaches a temperature of from about 82° C. to about 85° C. To the beaker is added 174.15 g of Puralox® SCCa 5/150, and the slurry temperature is maintained at from about 82° C. to about 85° C. In a separate mixing vessel, a metals solution is prepared by combining about 958 mL of an aqueous hexaamminecobalt (II) carbonate solution prepared by reacting cobalt powder with aqueous ammonia in the presence of carbon dioxide to deliver about 5.2 g Co per 100 mL water and about 0.4096 mL of a platinum chloride solution (Colonial Metals, Elkton, Md., 21922). The metals solution is then poured into the alumina. The slurry temperature is maintained at from about 77° C. to about 85° C. for about 6 hours. The slurry is then allowed to slowly cool to ambient temperature. The solid material in the slurry is filtered and washed with about 500 mL of deionized water. The washed material is then spread on a stainless steel tray to a depth of from about 0.5 inches to about 1 inch, and is dried in a convection oven set to an oven temperature of about 93° C. The total drying time is about 16 hours. The cobalt coated aluminum oxide catalyst is then calcined in an electric box oven set at about 240° C. for about 2 hours.

EXAMPLE 3

A cobalt catalyst with a ruthenium promoter is prepared in a similar manner as the platinum promoted catalyst of Example 2, except 200 g of Puralox® SCCa 5/150 is added to 2.4 liters of deionized water; a metals solution is prepared by combining about 1730 mL of a hexaamminecobalt (II) carbonate solution prepared to deliver about 3.5 g Co per 100 mL water and about 37.08 g ruthenium nitrosyl nitrate solution (Noah Technologies, 1.23% Ru, catalog number 90443); and the metals solution is added to the slurry in about 200 mL aliquots at about 30 minute intervals until all the metals solution is added. The solid materials are washed first with about one liter of deionized water in a filter, and then with about two liters of deionized water in a filter press. The solid material is calcined as in Example 2.

EXAMPLE 4

A cobalt catalyst with a ruthenium and rhenium promoter is prepared from the cobalt/aluminum oxide catalyst prepared as described in Example 1. In a separate vessel, 3.25 g of rhenium (VII) oxide (Noah Technologies, 99.99% purity, catalog number 12199) and 2.68 g of ruthenium nitrosyl nitrate (Noah Technologies, 1.23% Ru, catalog number 90443) are dissolved in about 60 mL of deionized water. Then 272.98 g of the cobalt/alumina material prepared in Example 1 is added to the solution in a 1 gallon plastic bucket for an incipient wetness impregnation. The bucket is agitated vigorously at predetermined intervals over about a one-hour period. The material is then filtered, washed, and dried in a convection oven set at 93° C. with an air flow of about 2.5 SCFH overnight.

EXAMPLE 5

A cobalt catalyst without a promoter is prepared using a prior art nitrate impregnation method. A 3.68 M cobalt(II) nitrate solution is prepared by dissolving about 380 g cobalt (II) nitrate hexahydrate (Shepherd Chemical Company, Norwood, Ohio, catalog number 1275, technical grade) in deionized water for a total volume of about 355 mL. In a 3.8 L plastic container, about 125 mL of the cobalt(II) nitrate solution is then poured over about 250 g of Puralox SCCa 5/150 at ambient conditions. A lid is placed on the container and the container is agitated by hand for about 1 minute or until the aluminum oxide carrier is uniformly wetted. This material is dried at about 80° C. for about 10 hours with an air flow of about 1.7 SCFH, and is then calcined at about 240° C. for about 4 hours with an air flow of about 10.2 SCFH. The second and third incipient wetness impregnations follow with the same drying and calcination after each impregnation.

EXAMPLE 6

A cobalt catalyst with a platinum promoter is prepared using a prior art nitrate impregnation method. In a 1000 mL beaker, about 110 mL of melted cobalt nitrate crystals (Shepherd Chemical Company, Norwood, Ohio, catalog number 1275, technical grade) are quickly poured into about 300 g Puralox® SCCa 5/150 at ambient temperature. This material is calcined at about 340° C. for about 10 hours with an air flow of about 10.2 SCFH. The calcined material is then impregnated with about 99 mL of melted cobalt nitrate crystals, and calcined at about 340° C. for about 12 hours. The calcined material is then impregnated with about 90 mL of melted cobalt nitrate crystals, and calcined at about 340° C. for about 12 hours. In a separate vessel, about 1.30 g of platinum ammine nitrate solution (Aldrich Chemicals, Milwaukee, Wis. 53201, catalog number 27,872-6) is diluted with deionized water to a volume of about 47 mL. The diluted platinum solution is then added to about 200 g of the calcined material, and the platinum impregnated material is calcined at about 340° C. for about 12 hours.

EXAMPLE 7

A cobalt catalyst with a ruthenium promoter is prepared using essentially the same method as described in Example 6 except about 8.8 g of a ruthenium nitrosyl nitrate solution (NOAH Technologies, San Antonio, Tex. 78249, 99.9% pure, catalog number 90443) is substituted for the 1.30 g of platinum ammine nitrate solution.

EXAMPLE 8

A cobalt catalyst with a ruthenium promoter is prepared using essentially the same method as described in Example 5 except about 385 mL of an aqueous cobalt/ruthenium stock solution is prepared by dissolving about 306.15 g of cobalt nitrate hexahydrate and 37.12 gram ruthenium nitrosyl nitrate in deionized water. The cobalt/ruthenium solution is substituted for the cobalt solution of Example 5.

EXAMPLE 9

A cobalt catalyst with a ruthenium/rhenium promoter is prepared using essentially the same method as described in Example 8 except about 3.42 g of rhenium (VII) oxide (NOAH Technologies, San Antonio, Tex. 78249, 99.99% pure, catalog number 12199) is added to the cobalt/ruthenium stock solution.

EXAMPLE 10

A cobalt catalyst with a ruthenium/rhenium promoter is prepared using a prior art acetate impregnation method. In a 1000 mL beaker, a metals solution is prepared by dissolving about 204 g of cobalt acetate crystals (Aldrich, A. C. S. Reagent grade, catalog number 40,302-4) in deionized water to a final volume of about 600 mL, and then adding about 4.65 g of the ruthenium nitrosyl nitrate solution (NOAH Technologies, San Antonio, Tex. 78249, 99.9% pure, catalog number 90443) and 2.75 g of the rhenium (VII) oxide (NOAH Technologies, San Antonio, Tex. 78249, 99.9% pure, catalog number 12199). The metals solution volume is then adjusted to about 630 mL with deionized water. In a separate 3.8 L plastic bucket; about 84 mL of the metals-solution is added to about 153 g Puralox SCCa 5/150. The treated alumina material is dried at about 120° C. in an air circulating oven with an air flow of about 5 SCFH. Then about 80 mL of the metals solution is added to the treated alumina material and the material is dried in a similar manner as the first dip. Then about 75 mL of the metals solution is added to the treated alumina material. The material is then calcined a box furnace with an air line at about 240° C. for about 4 hours with 10.2 SCFH air flow. The process is then repeated twice with the material being impregnated with about 84 mL metals solution, then about 80 mL metals solution, then about 75 mL metals solution, with drying between each impregnation as noted above, and with a calcination step after each third impregnation, such that the material is impregnated a total of nine times, and calcined three times. The acetate decomposition is accompanied by a noticeable exotherm at about 320° C.

Table I summarizes the surface area, pore volume, pore diameter and cobalt crystallite size data for the catalysts prepared as described in Examples 1-10. The catalysts of the present invention have a higher surface area, a greater pore volume, and a smaller cobalt crystallite size (which translates to a greater cobalt dispersion) than the catalysts prepared by the impregnation method.

TABLE I

| Preperation Method | Ex. | % Co | Promoters | Surface Area ($m^3/g$) | Pore-Vol. ($cm^3/g$) | Pore Diameter (Å) | $Co_3O_4$ MCS (Å) |
|---|---|---|---|---|---|---|---|
| Untreated Puralox SCCa 5/150 | | none | None | 160.0 | 0.5011 | 125.5 | n/a |
| Present Invention | 1 | 20.9 | None | 171.0 | 0.3036 | 66.5 | 64 |
| Nitrate Impregnation | 5 | 21.0 | None | 97.4 | 0.2756 | 113.2 | 231 |
| Present Invention | 2 | 19.8 | 0.017% Pt | 212.6 | 0.3022 | 56.9 | 52 |
| Nitrate Impregnation | 6 | 24.1 | 0.031% Pt | 76.0 | 0.2619 | 85.5 | N/a |
| Present Invention | 3 | 20.5 | 0.11% Ru | 164 | 0.280 | | 55 |
| Nitrate Impregnation | 7 | 21.6 | 0.014% Ru | 105.4 | 0.2742 | 104.2 | 248 |
| Nitrate Impregnation | 8 | 21.2 | 0.12% Ru | 98 | 0.274 | | 155 |
| Present invention | 4 | 20.8 | 0.013% Ru/ 1.02% Re | 167.7 | 0.2651 | 63.2 | 86 |
| Nitrate Impregnation | 9 | 21.9 | 0.015% Ru/ 1.05% Re | 104.0 | 0.2682 | 103.2 | 194 |
| Acetate Impregnation | 10 | 22.7 | 0.02% Ru/ 0.95% Re | 115.2 | 0.2752 | 95.5 | 51 |

Figure 2:
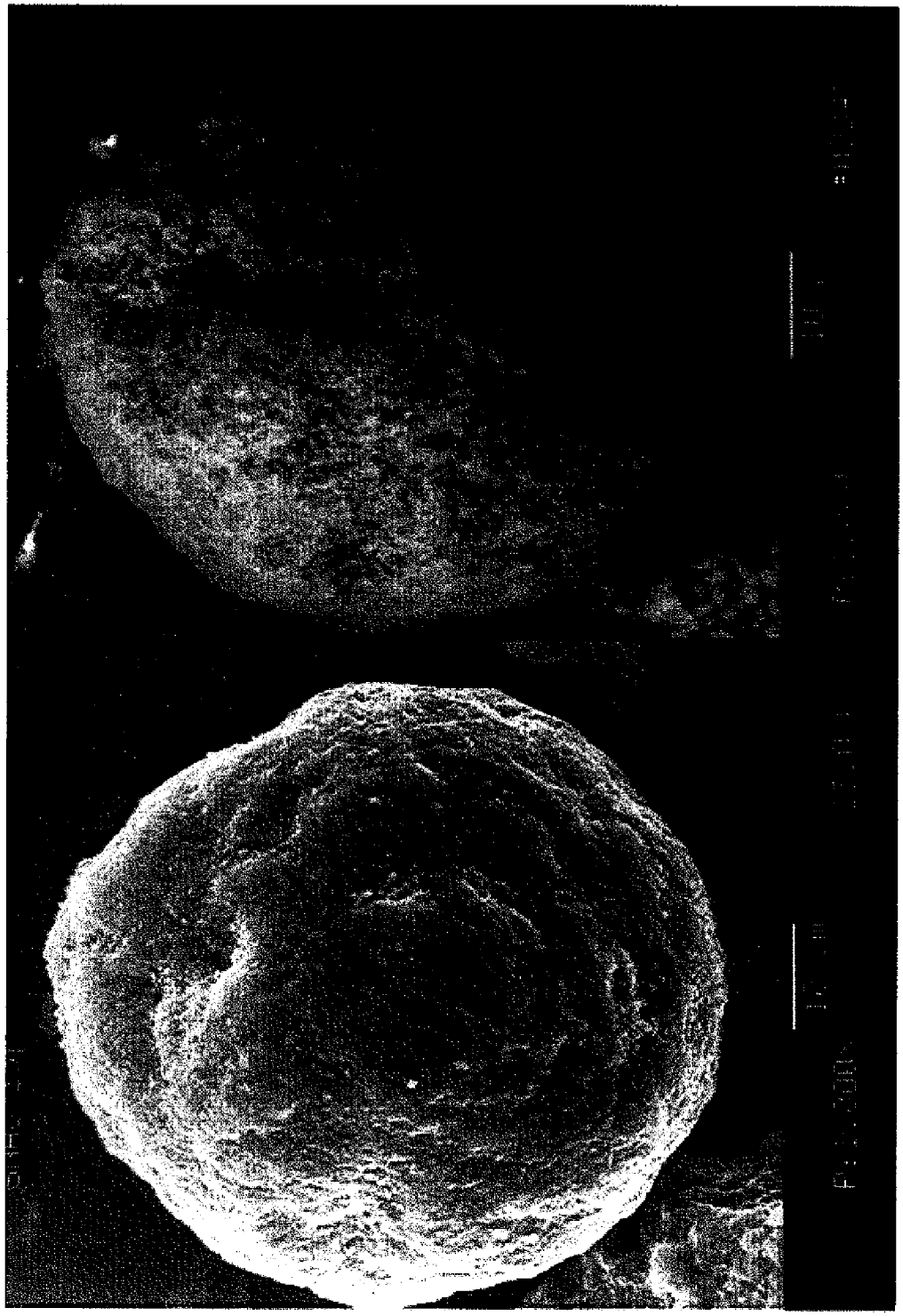
FIG. 2A is a secondary electron image of scanning electron micrograph, magnification 1640× (measured when the image is produced in a sheet of 8.5"×11" paper), of a catalyst prepared using the nitrate impregnation method, the catalyst being a platinum promoted cobalt coated aluminum oxide catalyst prepared as described in Example 6.
FIG. 2B is a back-scattered electron image of scanning electron micrograph, magnification 1640× (measured when the image is produced in a sheet of 8.5"×11" paper), of the same catalyst particle of FIG. 2A.
Figure 3:
FIG. 3 is a back-scattered electron image of scanning electron micrograph, magnification 17,000× (measured when the image is produced in a sheet of 8.5"×11" paper), of an interior section of the same catalyst particle of FIG. 1A.
Figure 4:
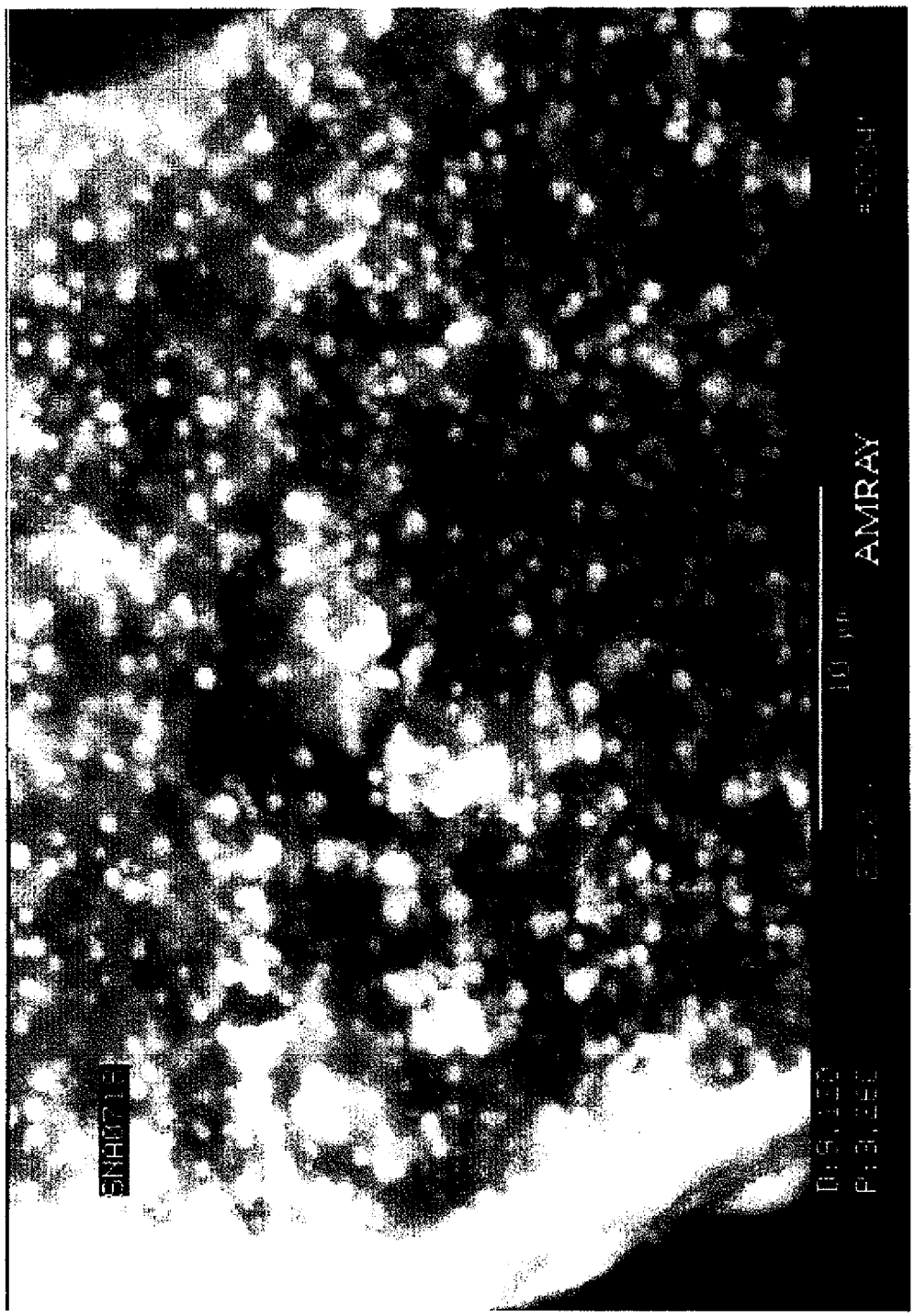
FIG. 4 is a back-scattered electron image of scanning electron micrograph, magnification 5000× (measured when the image is produced in a sheet of 8.5"×11" paper), of an interior section of the same catalyst particle of FIG. 2A.
Figure 7:
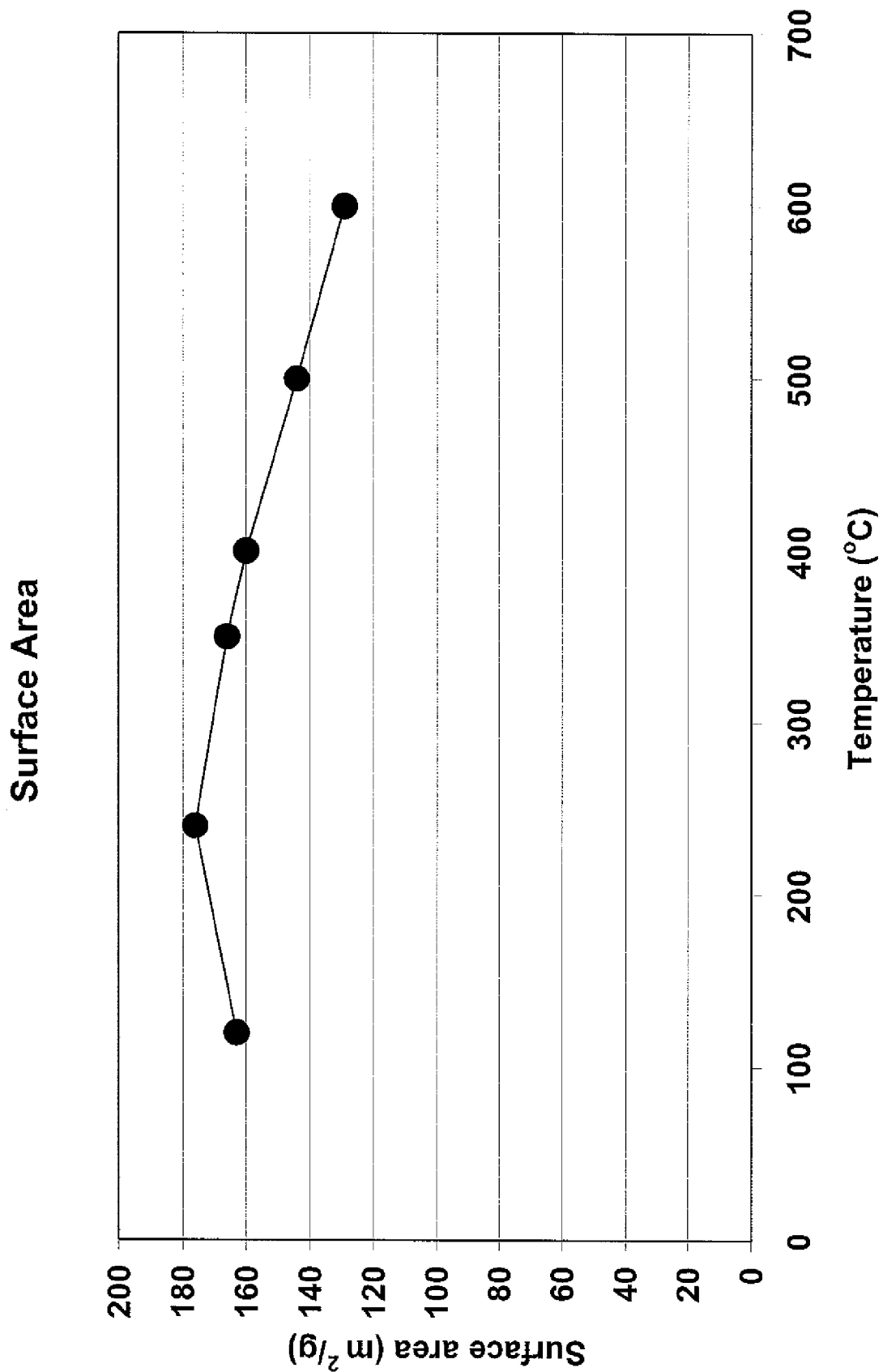
FIG. 7 is a graph showing the thermal stability of a platinum promoted cobalt coated aluminum oxide catalyst prepared as described in Example 1.

FIGS. 1A, 1B and 3 are scanning electron micrographs of an embodiment of a catalyst of the present invention prepared as described in Example 2, the catalyst being a platinum promoted cobalt coated aluminum oxide catalyst. As shown in FIGS. 1A and 1B, the catalyst has a relatively smooth surface morphology, and as shown in FIG. 3, the catalyst has an essentially uniform distribution of cobalt throughout the catalyst particle with a small cobalt crystallite size. For comparison, FIGS. 2A, 2B and 4 are scanning electron micrographs of a catalyst prepared as described in Example 6 using the nitrate impregnation method, the catalyst having a composition essentially identical to the catalyst of FIG. 1A. As shown in FIGS. 2A and 2B, the catalyst has a rougher surface morphology than the catalyst in FIGS. 1A and 1B, and as shown in FIG. 4, the catalyst has a more sporadic distribution of cobalt throughout the catalyst particle with a larger cobalt crystallite size than the catalyst of FIG. 3. FIG. 7 is a graph showing the thermal stability of a platinum promoted cobalt coated aluminum oxide catalyst prepared as described in Example 2.

The catalyst of the present invention is intended for use in the Fischer-Tropsch process and has a composition is similar to F-T catalysts of the prior art. However, the process by which the catalyst is prepared produces a finished product having specific desirable physical characteristics—a higher surface area, a smoother, more homogeneous surface morphology, a more uniform distribution of active sites, and a smaller crystallite size than the prior art F-T catalysts. It is understood that the composition of the catalyst and the specific processing conditions may be varied without exceeding the scope of this development.

What is claimed is:

1. A method for making a catalyst for use in a Fischer-Tropsch process, the catalyst comprising at least one metal that is an efficient carbon monoxide adsorber and at least one promoter dispersed on a support to form a plurality of catalyst particles, the catalyst particles having a BET surface area from about 100 $m^2/g$ to about 250 $m^2/g$ and an essentially smooth, homogenous surface morphology, the metal and promoter being dispersed on the support such that the catalyst has a metal oxide crystalline size from about 40 Å to about 200 Å, the method comprising:
    a) adding the support to water with agitation to form a slurry and maintaining the slurry at a temperature from about 35° C. to about 210° C.;
    b) adding an aqueous metal salt solution to the slurry with agitation while maintaining the slurry temperature from about 65° C. to about 120° C., wherein the aqueous metal salt solution has a pH value greater than a point of zero charge of the support;
    c) agitating the slurry and maintaining the slurry temperature from about 65° C. to about 120° C. until the metal salt is essentially completely reacted with the support;
    d) separating the slurry into a solid portion and a liquor portion;
    e) washing the solid portion with water;
    f) drying and calcining the solid portion from about 90° C. to about 375° C. to form a plurality of catalyst particles;
    g) impregnating the catalyst particles with at least one promoter; and
    h) reducing the catalyst particles by heating the particles from ambient temperature to a temperature ranging from about 300° C. to about 500° C. at a rate of from about 0.1° C./min to about 10° C./min over a period ranging from about 5 hours to about 41 hours.

2. The method of claim 1 wherein the slurry temperature is maintained from about 65° C. to about 120° C. in step a).

3. The method of claim 1 wherein the solid portion is dried from about 120° C. to about 260° C. in step f).

4. The method of claim 1 wherein the catalyst particles are reduced in step h) by heating the particles from ambient temperature to about 350° C. at a rate of about 1.0° C./min and then holding the particles at about 350° C. from about 12 hours to about 16 hours.

5. The method of claim 1 further including coating the catalyst particles with oil after step h).

6. The method of claim 1 wherein in step f), the promoter is impregnated onto the catalyst particles by dipping the catalyst particles in an aqueous solution of the promoter while maintaining agitation, and then separating the impregnated catalyst particles from the solution, and drying the impregnated catalyst particles.

7. A catalyst for use in a Fischer-Tropsch process, the catalyst comprising at least one metal that is an efficient carbon monoxide adsorber and at least one promoter dispersed on a support to form a plurality of catalyst particles, the catalyst particles having a BET surface area from about 100 $m^2/g$ to about 250 $m^2/g$ and an essentially smooth, homogenous surface morphology, the metal and promoter being dispersed on the support such that the catalyst has a metal oxide crystalline size from about 40 Å to about 200 Å, the catalyst being made by a method comprising:
    a) adding the support to water with agitation to form a slurry and maintaining the slurry at a temperature from about 35° C. to about 210° C.;
    b) adding an aqueous metal salt solution to the slurry with agitation while maintaining the slurry temperature from about 65° C. to about 120° C., wherein the aqueous metal salt solution has a pH value greater than a point of zero charge of the support;
    c) agitating the slurry and maintaining the slurry temperature from about 65° C. to about 120° C. until the metal salt is essentially completely reacted with the support;
    d) separating the slurry into a solid portion and a liquor portion;
    e) washing the solid portion with water;
    f) drying and calcining the solid portion from about 90° C. to about 375° C. to form a plurality of catalyst particles;
    g) impregnating the catalyst particles with at least one promoter; and
    h) reducing the catalyst particles by heating the particles from ambient temperature to a temperature ranging from about 300° C. to about 500° C. at a rate of from about 0.1° C./min to about 10° C./min over a period ranging from about 5 hours to about 41 hours.

8. The catalyst of claim 7 wherein the metal is selected from the group consisting of nickel, cobalt, and iron, ruthenium, osmium, platinum, palladium, iridium, rhenium, molybdenum, chromium, tungsten, vanadium, rhodium, copper, zinc and combinations thereof.

9. The catalyst of claim 7 wherein the metal is cobalt.

10. The catalyst of claim 7 wherein the support is selected from the group consisting of aluminum oxide, γ-alumina, alumina monohydrate, alumina trihydrate, alumina-silica, silica, silicate, silicalite, y-zeolite, mordenite, titania, thoria, zirconia, niobia, hydrotalcite, kieselguhr, attapulgite clay, zinc oxide, other clays, other zeolites and combinations thereof.

11. The catalyst of claim 7 wherein the support is aluminum oxide.

12. The catalyst of claim 7 wherein the support is γ-alumina.

13. The catalyst of claim 7 wherein the aqueous metal salt solution comprises water and a complex of a divalent metal having coordination sphere ligands selected from the group consisting of water, chloride ion, ammonia, pyridine, triphenylphospine, 1,2-diaminoethane, diethylenetriamine, triethylenetetraamine, acetate, oxlate, 2,4-pentanedione, ethylenedinitrilo tetraacetic acid, and combinations thereof.

14. The catalyst of claim 7 wherein the aqueous metal salt solution comprises water and a complex of a divalent cobalt having coordination sphere ligands selected from the group consisting of water, ammonia, pyridine, 1,2-diaminoethane, diethylenetriamine, triethylenetetraamine, and combinations thereof.

15. The catalyst of claim 14 wherein the complex of divalent cobalt is hexaammine cobalt (II) carbonate.

16. The catalyst of claim 7 wherein the support has a particle size of about 60 μm to about 150 μm, a surface area from about 90 m$^2$/g to about 210 m$^2$/g, a pore volume from about 0.35 ml/g to about 0.50 ml/g, and a pore diameter from about 8 nm to about 20 nm.

17. The catalyst of claim 7 wherein the promoter is a metal salt selected from the group consisting of rhenium (VII) oxide, ruthenium nitrosyl nitrate, platinum chloride, platinum ammine nitrate, platinum ammine chloride, and combinations thereof.

18. The catalyst of claim 7 wherein the catalyst particles comprise about 5 wt % to about 60 wt % cobalt, about 0.0001 wt % to about 1 wt % of a first promoter, and about 0.01 wt % to about 5 wt % of a second promoter.

19. The catalyst of claim 7 wherein the catalyst particles comprise about 10 wt % to about 30 wt % cobalt, about 0.01 wt % to about 0.05 wt % of a first promoter, and about 0.1 wt % to about 1 wt % of a second promoter.

20. The catalyst of claim 19 wherein the first promoter and second promoter are selected from the group consisting of boron, cerium, chromium, copper, iridium, iron, lanthanum, manganese, molybdenum, palladium, platinum, rhenium, rhodium, ruthenium, strontium, tungsten, vanadium, zinc, sodium oxide, potassium oxide, rubidium oxide, cesium oxide, magnesium oxide, titanium oxide, zirconium oxide, scandium, yttrium, praseodymium, neodymium, promethium, samarium, europium, gadolinium, terbium, dysprosium, holmium, erbium, thulium, ytterbium, lutetium, and combinations thereof.

* * * * *